United States Patent [19]
Caronni et al.

[11] Patent Number: 5,822,434
[45] Date of Patent: *Oct. 13, 1998

[54] SCHEME TO ALLOW TWO COMPUTERS ON A NETWORK TO UPGRADE FROM A NON-SECURED TO A SECURED SESSION

[75] Inventors: Germano Caronni, Zurich, Switzerland; Rich Skrenta, Mountain View; Tom Markson, San Mateo, both of Calif.; Ashar Aziz, Islamabad, Pakistan

[73] Assignee: Sun Microsystems, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 665,410
[22] Filed: Jun. 18, 1996
[51] Int. Cl.$^6$ ....................................................... H04L 9/00
[52] U.S. Cl. ........................ 380/49; 395/186; 395/187.01
[58] Field of Search ............................... 380/49; 395/186, 395/187.01

[56] References Cited

U.S. PATENT DOCUMENTS

| | | | |
|---|---|---|---|
| 5,235,642 | 8/1993 | Wobber et al. | 380/25 |
| 5,428,745 | 6/1995 | De Bruijn et al. | 380/49 X |
| 5,444,782 | 8/1995 | Adams, Jr. et al. | 380/49 |
| 5,515,439 | 5/1996 | Bantz et al. | 380/23 |
| 5,548,646 | 8/1996 | Aziz et al. | 380/23 |
| 5,590,202 | 12/1996 | Bestler et al. | 380/49 |
| 5,615,266 | 3/1997 | Altschuler et al. | 380/21 |

*Primary Examiner*—Thomas H. Tarcza
*Assistant Examiner*—Pinchus M. Laufer
*Attorney, Agent, or Firm*—Blakely, Sokoloff, Taylor & Zafman

[57] ABSTRACT

An apparatus for allowing communications to a target host on a network to be upgraded from a non-secured session to a secured session. The apparatus including a processor; a memory coupled to the processor and storing an access control list; and a network interface coupled to the processor, the network interface communicating with a target host; wherein the memory is configured to cause the processor to: (1) create an access control entry for the target host in the access control list; (2) exchange security information with the target host; (3) update the entry for the target host to include the security information; and, (4) communicate with said target host using said security information.

A method for allowing communications to a target host on a network to be upgraded from a non-secured session to a secured session having the steps of: (1) creating an access control entry for the target host in the access control list; (2) exchanging security information with the target host; (3) updating the entry for the target host to include the security information; and, (4) communicating with the target host using the security information.

17 Claims, 2 Drawing Sheets

SCHEME TO ALLOW TWO COMPUTERS ON A NETWORK TO UPGRADE FROM A NON-SECURED TO A SECURED SESSION

BACKGROUND OF THE INVENTION

1. Field of the Invention

The present invention relates to the field of use of encryption of traffic over a large network. More particularly, the present invention relates to providing the capability for hosts on a network to upgrade from communications which are non-secured to communications which are secured.

2. Description of Related Art

Computers (i.e., hosts) on large networks such as the Internet typically communicate with many other hosts via a number of different protocol/services, such as: hypertext transport protocol (http); simple mail transport protocol (smtp); network news transfer protocol (nntp); post office protocol, version 3 (pop3); domain name system (DNS); and file transfer protocol (ftp). These communications are typically done "in the clear" as no encryption is being performed on the data that is being exchanged. However, in view of the increasing emphasis on providing secure and private transactions between hosts, a logical solution is to require that hosts encrypt all traffic, whether or not that traffic is being sent over the Internet, a company's internal corporate "intranet," or both, For the above-mentioned solution, a particular host, whether seeking to communicate with another host located on an intranet or the Internet, would encrypt all traffic it sent out and also expect all received communications to be encrypted. In theory, this would ensure that all communications of that host would be secure. However, under practical considerations, as most hosts do not have encryption/decryption capabilities, a host cannot currently require encryption from all other hosts. To do so would result in the host withdrawing from the Internet as most other hosts on the Internet currently do not have security software installed.

Host administrators may manually specify a small group of peer hosts for which the host administrator is aware has encryption capabilities and therefore require secure sessions for communications. However, this is not practical as: (1) this list of secure hosts will become more and more unwieldy as more and more hosts gain encryption capabilities and are added to the list, especially considering the scale of the Internet (the problem mirroring the "hosts" file problem before DNS); (2) host administrators will have to manually update the list, adding to the burdens of the host administrator; (3) the list can be either inadvertently or purposely changed, causing a host to encrypt traffic to a host that does not support secure sessions and thereby preventing communications between the hosts; and, (4) hosts that do not have a "static" IP address (e.g., computers which are assigned dynamic IP addresses) cannot be placed on the list.

Therefore it would be desirable to have a scheme to allow the dynamic detection of the encryption capabilities of a host, and instigation of the use of encryption if encryption capabilities are detected. For example, if two hosts are running an encryption protocol such as Simple Key management in IP (SKIP), both hosts would discover this and attempt to switch to an encrypted mode. The scheme will allow a host administrator to specify a security policy that dictates:

"Require encryption to host A. Always speak in the clear to host B. Other hosts may connect in the clear, but encrypt if both hosts can encrypt (e.g., if both sides speak SKIP)."

Moreover, even though the discovery of whether encryption may be used may take some time, the scheme should not cause any delay before packets containing "real" data start to be exchanged, even if it is later determined that encryption will not eventually occur (e.g., the other host is not capable of secure communications). An active Internet host exchanging traffic with many other sites will not be willing to endure delay for initial connections and noticeable initial delay would hamper adoption of security protocols, such as SKIP, by host administrators.

As the traffic may not be upgraded to an encrypted connection until after some packets have been sent in the clear, an active attack may thwart the discovery of whether other hosts are capable of encrypting, thereby forcing the hosts to speak in the clear when the hosts could be encrypting. But since the hosts would otherwise be sending traffic in the clear, it is acceptable to provide weaker security than otherwise would be desirable.

The scheme should also provide the capability to recover from states where a host ceases to handle encryption (e.g., the host loses its secret key). For example, two hosts are speaking SKIP and one host reboots and forgets its secret or boots another operating system which does not support SKIP. The two hosts must be able to fall back to clear communication.

To facilitate wide spread adoption of encryption protocols on hosts, an "optional encryption" scheme of operation should be provided. This mode would allow two encryption-enabled hosts which would otherwise exchange traffic in the clear to upgrade to encrypted communication. Graceful fall-back to clear communication must also be provided to support sites which cease to support encryption.

A host which installs SKIP or any other encryption protocol must not suffer disruption of its normal services. If a host uses an encryption protocol and suffers delays for all of its new connections or the administrator becomes frustrated with communication problems, the administrator will not look favorably on encryption protocols, and widespread adoption will be hampered.

SUMMARY OF THE INVENTION

A scheme is proposed where an encrypting host will allow packets to initially flow in the clear, while simultaneously attempting to complete a certificate exchange with one or more target hosts. If and when a certificate exchange is successful with a particular target host, the encrypting host can begin to encrypt the packets that are sent to that target host.

The scheme utilizes an access control list (ACL) in each host supporting encryption to track the encryption capabilities of hosts with which a host is currently communicating. An ACL daemon is used to add and remove ACL entries based on a "time-to-live" (TTL) value which is associated with each ACL entry.

During normal operations, a "speak-in-the-clear" ACL entry is added by the ACL daemon to the ACL with a default TTL value for the target host. If the internet protocol (IP) address of the encrypting host is lower than the IP address of the target host, then the encrypting host will initiate a Certificate Discover Protocol (CDP) PUT/GET command with the target host. If the CDP is successful, both the encrypting host and the target host will upgrade communications to the default optional encryption settings and simultaneously change their corresponding ACL entries to reflect that all communications is to be encrypted. Operation will then continue as normal, with both the encrypting host and the target host encrypting communication to each other with encryption.

Other objects, features and advantages of the invention will be apparent from the accompanying drawings, and from the detailed description that follows below.

DETAILED DESCRIPTION OF THE INVENTION

The present invention provides a method and apparatus for upgrading communications between two hosts on a network from an unsecured mode to a secure mode. For purposes of explanation, specific embodiments are set forth to provide a thorough understanding of the present invention. However, it will be understood by one skilled in the art, from reading this disclosure, that the invention may be practiced without these details. Further, although the present invention is described through the use of the Simple Key management in IP (SKIP) encryption protocol and the Diffie-Hellman key exchange model, most, if not all, aspects of the invention apply to the deployment of encryption protocols in general. Moreover, well-known elements, devices, process steps and the like are not set forth in detail in order to avoid obscuring the present invention.

Figure 1:
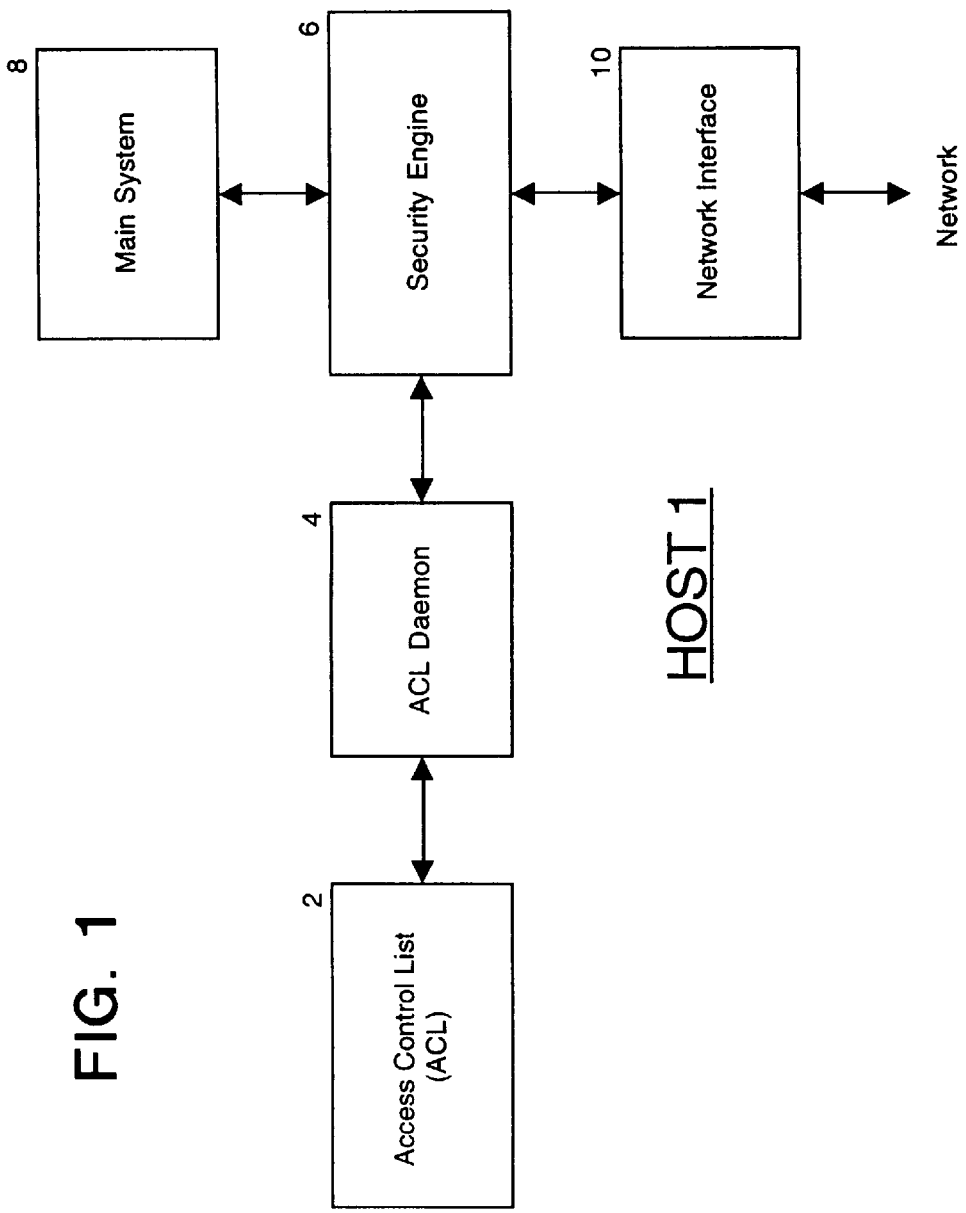
FIG. 1 illustrates a host 1 configured in accordance with a preferred embodiment of the invention.

FIG. 1 illustrates a block diagram of a host 1 configured in accordance with a preferred embodiment of the invention, having: an access control list (ACL) 2; ACL daemon 4; an security engine 6; main system 8; and a network interface 10.

Main system 8 represents all the components of a general purpose computer system except for the functionality provided by ACL 2, ACL daemon 4, security engine 6, and a network interface 10. Thus, main system 8 provides such functionality as application/data processing, graphics display, user interface control, and information storage/retrieval. As the functions of main system 8 as a general purpose computer system are well-known in the art, no further description is included herein, except as needed to describe the present invention.

Security engine 6 is coupled to main system 8 to provide security functions such as encryption/decryption of data, and certificate management. In the preferred embodiment, security engine 6 implements the Simple Key management in IP (SKIP) encryption protocol, a protocol developed by Sun Microsystems, Inc. Security engine 6 provides for optional encryption/decryption of any data sent to or received from main system 8. Thus, where it is determined that no security is desired for a particular session, security engine 6 is set to not enable any security features.

Network interface 10 is coupled to security engine 6 to provide network access for host 1. Thus, network interface 10 processes the data that has been encrypted by security engine 6 to be sent out over the network. Network interface 10 also processes the data received from the network and feeds that into security engine 6. In the preferred embodiment, network interface 10 implements the Transmission Control Protocol/Internet Protocol (TCP/IP).

ACL 2 is used to track the encryption capabilities of other hosts with which host 1 is currently communicating. In a preferred embodiment, each host with which host 1 is communicating has one entry in ACL 2. Each entry consists of a host name; a time-to-live (TTL) value for the entry; and an encryption format with which host 1 should use when communicating with the host of that entry. As described below, an entry in ACL 2 can either be added by ACL daemon 4 or manually added by a system administrator.

Manual entries in ACL 2 are used to specified the encryption mode for all communications to the host of that entry. Thus, for example, a host administrator can designate that all communications to a host A is to be encrypted using the Data Encryption Standard (DES) and all communications to host B is not to be encrypted. Automatic entries to ACL 2 are used for tracking encryption capabilities of hosts that do not exist in ACL 2 as a manual entry, but are dynamically added as described, below.

ACL daemon 4, which is coupled to security engine 6 and ACL 2, is used to add and remove ACL entries in ACL 2 in response to communications with other host by host 1. ACL entries are removed based on each ACL's TTL value, as described below.

In a preferred embodiment, the default TTL value given to an automatic entry is 5 minutes. Manually added ACL entries are assigned a TTL value of −1 and never expire (i.e., manually added ACL entries have to be manually removed). All TTL values that are added by ACL daemon 4 (i.e., all TTL values that do not have a value of −1) are decremented periodically until any of them reach zero, at which point any ACL entries containing a zero TTL value is removed. However, each time a packet is received from a host that matches an automatic entry in ACL 2, if the ACL entry has a TTL value greater than or equal to zero, then the TTL value for that entry is reset to the default TTL value (i.e., 5 minutes).

A new certificate exchange and set-up will have to occur when a particular host which had an entry in ACL 2 is removed from the list as being automatically expired when the TTL value for that host reaches zero. This can be due to either inactivity on the part of that host or that host losing the ability to speak in the mode (encrypting or non-encrypting) required by host 1.

The present invention operates when: (1) host 1 begins to send a packet to a new host, or (2) host 1 receives a packet from a new host. In either (1) or (2), there is no entry in ACL 2 for the new host, and there has not been a recent (e.g., less than five minutes) exchange of traffic between host 1 and the new host.

Host 1 has to determine if communications sent to the new host can be encrypted, and encrypt communications if the new host does indeed support encryption.

Since this determination may take some time and since most of the hosts with which host 1 currently speaks are not currently SKIP enabled, host 1 will initially send packets in the clear while simultaneously starting another process to see if the connection can be upgraded to an encrypted mode.

Figure 2:
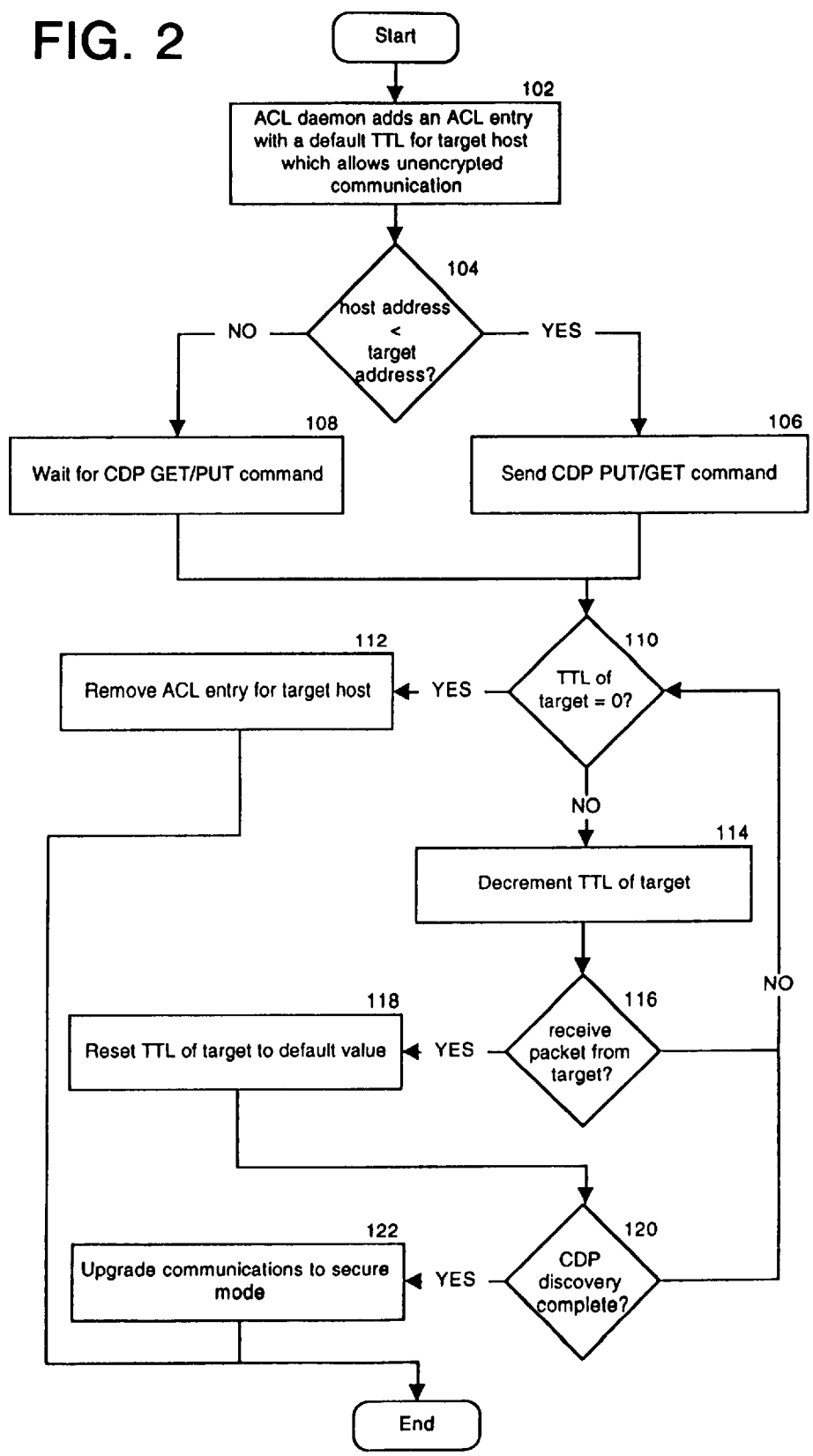
FIG. 2 is a flow diagram illustrating a preferred mode of operation for the present invention.

FIG. 2 illustrates a flow diagram of the preferred embodiment of the upgrade process, where a packet has been sent to or received from a target host which does not exist in any other ACL entry.

In block 102, a "speak-in-the-clear" ACL entry is added by ACL daemon 4 to ACL 2 with a default TTL value for the target host. As described above, the default TTL value for the ACL entry is initially set to 5 minutes.

In block 104, if the IP address of host 1 is lower than the IP address of the target host, then host 1 will initiate a Certificate Discover Protocol (CDP) PUT/GET command with the target host, as described in block 106.

CDP is a protocol which may be used to exchange or retrieve certificates (essentially signed public keys) with or from another host. CDP may be used to request certificates from a directory/name server or from the host who owns the certificate. CDP allows certificate requests to be made to any arbitrary IP-node. This feature allows the initiating host to send requests to an IP-node which is acting as a certificate server (and hence would have many certificates stored in its local certificate database) or to a single IP-node which only has it's own certificate.

Each certificates has at least two properties: (1) it provides for a cryptographic binding to a name/identity of a host; and (2) it provides integrity protection of a public key of the that host. The name may be encoded in the certificate or it may be implicit in the public key itself (i.e., the cryptographic hash of the public key).

As with various certificate types, numerous naming conventions exist on the Internet, for example, IP addresses, DNS names and PGP user names. Note that a particular entity may have more than one certificate. An entity may have the same public value in different certificate formats, or have multiple public values each in a separate certificate or have the same public value certified by different Certifying Authorities (CA), and so on. In all these possible certificates, the "identity" of the entity remains constant.

In block 106, the PUT command supplies the certificate of the host 1. At the same time, host 1 also issues a GET command, which requests certificates by Name. A Name is defined as a Name Record consisting of a Name Type, a Name Length and the actual Name of the entity who the certificate belongs to. The Name Type specifies the type of name, for example, a PGP printable string or a SKIP name. In the case where the Name Type is SKIP, the actual name consists of a Name Space Identifier (NSID) followed by the Master KeyID (MKID).

SKIP uses two 1 byte fields in the SKIP header—Source Name Space ID (NSID) and Destination NSID—to indicate that Master Key-IDs will be used for looking up authenticated public values instead of the source and/or destination IP addresses. These fields also identify which name space is being used for Master Key-IDs.

The term Master Key-ID is used instead of certificate ID, since the SKIP protocol allows manual master key setup. Master Key-ID is a generic term used to identify a particular Kij, whether it is obtained manually or through use of certified Diffie-Hellman public values. Master Key-IDs effectively decouple the identification of a master key for purposes of key lookup and access control from issues of network topology, routing and IP addresses. As one example, this allows IP nodes to use different IP addresses for routing and key lookup purposes. More importantly, it allows non-IP entities, such as individual users, to be identified using whatever name space is being used for them.

SKIP permits multiple name spaces to be used by using the NSID fields in the SKIP header. The first NSID byte refers to the name space of the source Master Key-ID, and the second NSID refers to the name space of the destination Master Key-ID. Although a Master Key-ID MAY be allocated out of the IPv4/v6 address spaces, it is never used for IP routing purposes. Instead, it is used as a semi-permanent identifier for a master key.

To illustrate one possible use, this decoupling allows nodes to move around on the network, and come in from dynamically assigned IP addresses (using, for example, the Dynamic Host Configuration Protocol) and still have access control and Diffie-Hellman public value lookup occur based on the source Master Key-IDs.

Still other examples include mobile users, identified in any name space, who can securely access network data and services from many different IP nodes. This is because key lookup and access control will be based on their native names (identified using the Source Master Key-ID), and not the IP address of the node from which they are performing the network access. These users may carry around their private keys in smart cards, or alternatively, these private keys may be distributed over the network encrypted in a per-user password. Users may be identified using such names as DNS names, POSIX/XOPEN user ids, and X.500 Distinguished Names.

Similarly Destination Master Key-IDs can serve many purposes as well. When the Destination Master Key-ID refers to an IP address, it can be used to pass end-to-end encrypted SKIP packets through an encrypting intermediate node. Without a destination Master Key-ID, an intermediate node which is encrypting/decrypting SKIP packets for multiple machines would have no way of knowing whether a received packet should be uncompressed/decrypted/authenticated or just forwarded. A destination Master Key-ID enables an encrypting intermediate node (e.g., router or firewall) to determine whether to process a packet or simply forward it.

The destination Master Key-ID is present when the Destination NSID is non-zero. On an end node, the Destination Master Key-ID can be used to distinguish between multiple users on the same IP node. If the Source NSID is non-zero, the source Master Key-ID MUST be used for public value lookups and the source IP address MUST NOT be used. If the Destination NSID is non-zero, the destination Master Key-ID MUST be used for public value lookups and the destination IP address MUST NOT be used. It is to be noted that a host MUST NOT process a packet which has a destination Master Key-ID that does not match a local Master Key-ID even if the destination IP address matches.

Some commonly used name spaces have been assigned NSIDs. These are specified below. More name spaces will be registered through Internet Assigned Numbers Authority (IANA).

| NSID | Name Space | Master Key ID length |
|------|------------|----------------------|
| 1 | IPv4 Address Space | 32-bits |
| 2 | POSIX/XOPEN User Ids | 32-bits |
| 3 | IPv6 Address Space | 128-bits |
| 4 | MD5 of DNS Names | 128-bits |
| 5 | MD5 of ISO DN ASN.1 encoding | 128-bits |
| 6 | MD5 of Arbitrary ASCII string | 128-bits |
| 7 | 802.x MAC Address | 48-bits |
| 8 | MD5 of Principal's DH Pub Val | 128-bits |
| 9 | MD5 of RFC-822 Mailbox Address | 128-bits |
| 10 | MD5 of Bank Account # | 128-bits |
| 11 | MD5 of NIS Name | 128-bits |

In block 108, if the IP address of host 1 is greater than or equal to the target host, host 1 will not initiate a CDP PUT/GET to prevent two simultaneous CDP sessions to be initiated. If the other side speaks optional SKIP, they will start the CDP. Note that it is not harmful if both sides were to initiate certificate discovery, only wasteful.

Whether host 1 initiates certificate discovery (as in block 106) or waits for the target host to initiate certificate discovery (as in block 108), operation will continue with block 110.

In block 110, the TTL value of the ACL entry for the target host is checked to see if it is equal to zero (i.e., ACL daemon 4 checks to see if the ACL entry for the target host has expired). If the ACL entry for the target host has expired, indicating that there has not been a packet received from the target host within the default TTL period, then operation will continue with block 112. As described above, "permanent" ACL entries, which are added by the system administrator, never expire and have a TTL value of −1.

In block 112, the ACL entry for the target host is removed as it is assumed that the target host is no longer communicating with host 1. If a packet is received from the target host after the ACL entry for the target host is removed from ACL 2, then the upgrade process will have to begin from the beginning. That is, the certificate exchange will have to begin again.

In block 114, the TTL value in the ACL entry for the target host is decremented. Operation will then proceed with block 116.

In block 116, if a packet is received from the target host, then operation will continue with block 118, where the TTL value in the ACL entry for the target host is reset to the default ACL value. As described above, in the preferred embodiment, the default TTL value is five minutes. If no packet is received from the target host, operation will return to block 110.

In block 120, where a packet is received from the target host, a check is made to see if the certificate exchange is complete. If the certificate exchange is complete, then operation will continue with block 122.

In block 122, if the CDP is successful, both host 1 and the target host will upgrade communications to the default optional encryption settings (in the preferred embodiment, both sides would use DES) and simultaneously change their corresponding ACL entries to reflect that all communications is to be encrypted with DES. Operation will then continue as normal, with both host 1 and the target host encrypting communication to each other with DES.

If an ICMP_PROTOCOL_UNREACHABLE is received from a host which has an ACL entry with a TTL greater than or equal to zero, the ACL should be switched to allow clear traffic. However, such fall-backs to unsecured communication modes should be logged.

ICMP_PROTOCOL_UNREACHABLE can be also ignored. In this case, it takes host 1 the time of TTL to recognize a host which is no longer SKIP capable. This avoids a ICMP_PROTOCOL_UNREACHABLE attack which would force communications between host 1 and the target host into the clear mode.

An option should be provided for ACL daemon 4 to add optional encrypted ACL entries with a TTL of 0. This would allow clear sites to upgrade to encrypted communication, but provide for no automatic fall-back. Once a host used encryption, manual removal of the ACL entry would be necessary.

When host 1 receives an encrypted packet from a target host that does not have an entry in ACL 2 (assuming an optional encryption default case)—perhaps due to the ACL entry for the target host in ACL 2 being expired—if host 1 has received an NSID 13 encrypted packet, ACL daemon 4 should complete an NSID 13 CDP GET/PUT with the target host again, and add the optional encryption ACL entry to ACL 2.

As mentioned above, in the preferred embodiment, the default value for TTL's should be on the order of 5 minutes, since TTL expiration is used to help clear ACL 2 of the hosts which have lost their ability to speak SKIP, but for which host 1 has not an ICMP_PROTOCOL_UNREACHABLE message. Using an overly large value for the default TTL would prevent host 1 from speaking with a host that lost its ability to speak SKIP for an undue long period of time—i.e., the amount of time of the overly large default TTL value. However, setting the default TTL to a very small value can cause pre-mature removal of entries from ACL 2 in situations, for example, where network latency or other delays prevents communications from a particular host from reaching host 1 in a time before the TTL for that host reaches zero.

In an alternate embodiment, a separate default TTL value for each new host can be dynamically calculated based on other factors, such as the location of the new host, the analysis of the past communication history with the new host, etc. In addition, not only can a default TTL value be calculated for each new host, but a NEW default TTL value can be calculated when resetting the TTL of the host. Thus, default TTL values can be more closely matched to each host and setting TTL values to the most efficient values—i.e., default TTL values which are neither too large or too small.

Although the security provided by this scheme is susceptible to "man-in-the-middle", and several active denial-of-service attacks, the scheme allows hosts to encrypt traffic which would otherwise travel in the clear, even if maximal security is not available. Thus, as much clear traffic as possible is encrypted to thwart passive attacks.

Once the optional encryption has been "turned-on," ACL packets sent to the target host will be encrypted. The target host has received the key of host 1 via the CDP PUT, and so should be able to begin decrypting the packets quickly. However, even though host 1 has turned-on the optional encrypt ACL entry, the target host may still have some clear packets on the way to host 1. The encrypt ACL entry for the target host will not allow these packets in. In the preferred embodiment, there are three ways of dealing with this situation: (1) allow clear packets to enter for a short time after encryption has been turned-on; (2) allow clear packets until we see an encrypted packet from the target host; and (3) allow clear packets in addition to encrypted packets from the target host indefinitely. The decision of which implementation to deploy is up to the practitioner of the invention.

Without restricting the reset of the TTL value of a target host only upon receiving packets from the target host, if a target host reboots and loses its SKIP ability, but for some reason ICMP_PROTOCOL_UNREACHABLE messages are not received by host 1, the two hosts cannot talk. Using the present invention, by not updating unless an incoming packet is received from the target host, the ACL entry in ACL 2 for the target host will expire and fall-back will occur. The TTL value of the target host will not be reset by received clear packets.

What about a target host that never expects a response? Host 1 will do another successful CDP with the target host after the TTL for the ACL entry for that target host expires. The preferred embodiment exchanges certificates with the same g^x, g^y pair—generation of new secrets may not be needed.

An NSID 13 name (Master Key-ID, or MKID) is a combination of IPV4 address; a protocol number; and port number. Each host invents an ephemeral secret value. ACL daemon 4 trades the unsigned Diffie-Hellman public values under NSID 13 names with the target. The format of the actual certificate will be very similar to the current SKIP Unsigned Diffie-Hellman certificate. The name of the target host is always known, as the name of the target host is basically the IP address of the target host.

Updating host 1 with a new Diffie-Hellman value of a target host is done by a new CDP push. Whenever an NSID 13 certificate is pushed on host 1, host 1 should forget the old certificate associated with that name immediately.

If host 1 receives an NSID 13 push, host 1 should 1) require a CDP cookie exchange to validate the IP address it is coming from, and 2) ignore the push or raise a warning if the sender IP address does not match the NSID 13 name.

In another embodiment, partial perfect forward secrecy can be achieved. At any time during normal communications, host 1 may generate a new ephemeral secret value. Host 1 should then flush all of the optional encryption ACL entries in ACL 2, forcing re-negotiation of ephemeral secrets with every host to which a packet is sent, or from which a packet is received.

If host 1 only generates a new ephemeral key at an expiration boundary specified for the NSID 13 supplied certificate, host 1 will cache the packet encrypting key, and thus there is a window where host 1 can update its secret value without having to remember the old secret value, and not lose any incoming encrypted packets. Thus, keys should be switched only at N-counter boundaries, to avoid receiving packets with an expired key which host 1 can no longer understand.

In another mode of operation, where host 1 desires to communicate with a well-known host which has a signed certificate, but where host 1 is using an ephemeral Diffie-Hellman key. An ACL entry must be manually created, naming the well-known host and requiring encryption. Operation will proceed as follows for communications with the well-known host:

1. Host 1 will prepare a packet to be sent to the well-known host;
2. The packet finds the ACL requiring encryption to the well-known host;
3. Host 1 uses CDP to find the certificate of the well-known host (host 1 may optionally push its NSID 13 certificate as part of this exchange, which would remove the necessity of step 6, below);
4. Host 1 uses its ephemeral key and the certificate of the well-known host to encrypt the packet;
5. The well-known host receives the encrypted packet from host 1; and
6. The well-known host uses CDP to obtain the ephemeral public key of host 1 and asks for the NSID 13 name of host 1.

In other embodiments, the NSID 13 delivered certificates can have a validity period for which it is valid, on the order of an hour to a day. The secret need not be changed to issue a new certificate. However, setting expiration times for certificates will increase CDP traffic (although not significantly in comparison with the CDP traffic generated due to ACL time-outs). Note that certificate expirations by themselves do not generate CDP traffic—only attempting to communicate with a target host after a certificate has expired will cause new certificates to be exchanged.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. In a computer system having a memory, a processor coupled to said memory, and a network interface coupled to said memory and said processor, said network interface communicating with a target host, a method comprising the steps of:

initializing an access control list;

creating an access control entry with a time-to-live value for said target host in said access control list, said time-to-live value being automatically renewed when communications are received from said target host;

exchanging security information with said target host;

updating said entry for said target host to include said security information;

communicating with said target host using said security information; and, maintaining non-secure, clear communication with said target host even in the absence of said security information subsequent to said step of exchanging security information.

2. The method of claim 1, wherein said creating step comprises the steps of:

creating said access control entry with a host name, said time-to-live value, and a security mode;

setting said host name to be a target host name;

setting said time-to-live value in said access control entry to be a default value; and setting said security mode in said access control entry to be a default mode.

3. The method of claim 2, wherein:

said default value is five minutes.

4. The method of claim 2, wherein:

said default mode is non-secure.

5. The method of claim 1, wherein said exchanging step comprises the steps of:

sending a target host certificate request to said target host;

receiving a target host certificate from said target host; and, sending a host certificate to said target host.

6. The method of claim 1, wherein said exchanging step comprises the steps of:

receiving a host certificate request from said target host;

sending a host certificate to said target host; and receiving a target host certificate from said target host.

7. The method of claim 1, wherein said security information comprises:

a public number; and a target host public number of said target host.

8. The method of claim 1, further comprising the steps of:

checking said time-to-live value contained in said access control entry; and removing said entry for said target host based on a comparison of said time-to-live value and a first value which represents a time of expiration of said entry.

9. The method of claim 8, wherein:

said first value is zero.

10. The method of claim 8, further comprising the step of:

resetting said time-to-live value to a default value if a packet is received from said target host.

11. The method of claim 10, wherein:

said default value is five minutes.

12. An apparatus comprising:

a processor;

a memory coupled to said processor;

a network interface coupled to said processor and said memory, said network interface communicating with a target host;

said memory configured to cause said processor to:
  initialize an access control list;
  create an access control entry with a time-to-live value for said target host in said access control list, said time-to-live value being automatically renewed when communications are received from said target host;
  exchange security information with said target host;
  update said entry for said target host to include said security information;
  communicate with said target host using said security information; and,
  maintain non-secure clear communication with said target host even in the absence of said security information subsequent to said step of exchanging security information.

13. A computer program product for upgrading a non-secure communication session across a network into a secure communication session in a computer system having a memory, a processor coupled to said memory, and a network interface coupled to said memory and said processor, said network interface communicating with a target host, said computer program product comprising:

computer readable program code device configured to initialize an access control list;

computer readable program code device configured to create an access control entry with a time-to-live value for said target host in said access control list, said time-to-live value being renewed automatically when communications are received from said target host;

computer readable program code device configured to exchange security information with said target host;

computer readable program code device configured to update said entry for said target host to include said security information;

computer readable program code device configured to communicate with said target host using said security information; and, computer readable program code device configured to maintain non-secure clear communication with said target host even in the absence of said security information subsequent to said exchange of said security information.

14. The computer program product of claim 13 further comprising:

computer readable program code device configured to check said time-to-live value contained in said access control entry; and computer readable program code device configured to remove said entry for said target host based on a comparison of said time-to-live value and a first value which represents a time of expiration of said entry.

15. The computer program product of claim 14, further comprising:

computer readable program code device configured to adjust said time-to-live value based on said comparison.

16. The computer program product of claim 14, further comprising:

computer readable program code device configured to adjust said first value based on said comparison.

17. The computer program product of claim 14, further comprising:

computer readable program code device configured to reset said time-to-live value to a default value if a packet is received from said target host.

* * * * *

UNITED STATES PATENT AND TRADEMARK OFFICE
CERTIFICATE OF CORRECTION

PATENT NO. : 5,822,434
DATED : October 13, 1998
INVENTOR(S) : Caronni et al.

It is certified that error appears in the above-indentified patent and that said Letters Patent is hereby corrected as shown below:

On the title page:

Please delete "Jun. 18, 1996" as listed for the filing date and insert -- Jun. 19, 1996 --.

In column 11, line 22, please delete "subsequent to said step of exchanging security information." and insert -- subsequent to said exchange of said security information. --

Signed and Sealed this

Seventeenth Day of April, 2001

NICHOLAS P. GODICI

*Attest:*

*Attesting Officer*   *Acting Director of the United States Patent and Trademark Office*